United States Patent [19]
Uekusa et al.

[11] Patent Number: 5,713,196
[45] Date of Patent: Feb. 3, 1998

[54] VERTICAL GAS TURBINE SYSTEM

[75] Inventors: Hisao Uekusa, Tokyo; Tadahiko Kishikawa; Shinji Suzuki, both of Kanagawa-ken, all of Japan

[73] Assignee: Ebara Corporation, Tokyo, Japan

[21] Appl. No.: 619,417

[22] Filed: Mar. 21, 1996

Related U.S. Application Data

[63] Continuation of Ser. No. 314,374, Sep. 28, 1994, abandoned.

[30] Foreign Application Priority Data

Sep. 29, 1993 [JP] Japan ................................ 5-268226

[51] Int. Cl.$^6$ ........................ F02C 7/20; F02C 7/24
[52] U.S. Cl. ........................ 60/39.31; 60/39.33
[58] Field of Search ............... 60/2, 39.161, 39.31, 60/39.34, 39.35, 39.75, 39.33; 74/DIG. 5; 181/203, 213, 214, 215, 218; 290/52; 417/405

[56] References Cited

U.S. PATENT DOCUMENTS

| | | | |
|---|---|---|---|
| 3,274,395 | 9/1966 | Rizk | 290/52 |
| 3,462,949 | 8/1969 | Anderson et al. | 60/39.31 |
| 3,576,101 | 4/1971 | Setterblade | 60/39.31 |

FOREIGN PATENT DOCUMENTS

| | | | |
|---|---|---|---|
| 24424 | 2/1982 | Japan | 60/39.31 |
| 4-339137 | 11/1992 | Japan | . |
| 4-339138 | 11/1992 | Japan | . |
| 5-10152 | 1/1993 | Japan | . |
| 787739 | 12/1957 | United Kingdom | 60/39.31 |

OTHER PUBLICATIONS

Epitome of Lift Jet Engine JR 100H, p. 918, lines 28–29, Journal of the J.S.M.E., vol. 70, No. 581.

*Primary Examiner*—Louis J. Casaregola
*Attorney, Agent, or Firm*—Armstrong, Westerman, Hattori, McLeland & Naughton

[57] ABSTRACT

A gas turbine system having a gas turbine accommodated in a soundproof enclosure, reduction gears connected to the gas turbine, and a pair of inlet and exhaust air silencers attached to an inlet pipe and an exhaust pipe, respectively, of the gas turbine, wherein the gas turbine and the reduction gears are a vertical gas turbine and a vertical reduction gears, which are stacked up, and shafts thereof are connected vertically, the vertical gas turbine and vertical reduction gears are accommodated in the soundproof enclosure, to thereby reduce the planar installation space of the gas turbine system.

6 Claims, 3 Drawing Sheets

VERTICAL GAS TURBINE SYSTEM

This application is a continuation of application Ser. No. 08/314,374 filed Sep. 28, 1994, now abandoned.

BACKGROUND OF THE INVENTION:

1. Field of the Art

The present invention relates to a gas turbine system and, more particularly, to a vertical gas turbine system which is designed so that the installation space for the system can be reduced.

2. Prior Art

A gas turbine system is, for example, used with a pump connected thereto to supply or discharge water by operation of the pump. In such an application, a gas turbine system is used, for example, in a pumping plant to pump water from a river when the water level of the river has risen.

FIG. 3 is a side view schematically showing a conventional gas turbine system of the type described above, which is connected with a pump. As illustrated in the figure, the conventional gas turbine system is arranged such that a driving shaft 75 of a horizontal gas turbine 71 is connected to a shaft 79 of an orthogonal speed reducer or reduction gears 77. The other shaft 81 of the orthogonal reduction gears 77 is connected to a main shaft 85 of a vertical pump 83 in order to connect the vertical pump 83 to the gas turbine system. As the horizontal gas turbine 71 is driven, the main shaft 85 of the vertical pump 83 is driven, and thus water is pumped up.

The horizontal gas turbine 71 is accommodated in a soundproof enclosure 73 for sound insulation. An air filter 87 is attached to the outside of the soundproof enclosure 73, and an exhaust air silencer 91 for deadening sound is attached to an exhaust pipe 89 of the horizontal gas turbine 71.

It should be noted that it is necessary in order to install the gas turbine system to provide a first floor 93 for installing the vertical pump 83 and a second floor 95 for installing the horizontal gas turbine 71, the orthogonal reduction gears 77 and other constituent elements. That is, the conventional gas turbine system adopts a double-floor structure.

In the above-described conventional gas turbine system, however, since the horizontal gas turbine 71, the orthogonal speed reducer 77, etc. are side-by-side installed on the plane of the second floor 95, the installation space therefor is disadvantageously large.

Further, the above-described conventional gas turbine system requires a double-floor building for installing it. From this point of view also, the installation space becomes undesirably large.

SUMMARY OF THE INVENTION

In view of the above-described circumstances, it is an object of the present invention to provide a gas turbine system which is designed so that the installation space can be reduced.

To solve the above-described problems, the present invention provides a gas turbine system having a gas turbine accommodated in a soundproof enclosure, reduction gears connected to the gas turbine, and a pair of inlet and exhaust air silencers attached to an inlet pipe and an exhaust pipe, respectively, of the gas turbine, wherein the gas turbine and the reduction gears are a vertical gas turbine and vertical reduction gears, which are stacked up, and shafts thereof are connected vertically, and the vertical gas turbine and the vertical reduction gears are accommodated in the soundproof enclosure, thereby constituting a vertical gas turbine system.

Preferably, in addition to the vertical gas turbine and the vertical reduction gears, the inlet air silencer and the exhaust air silencer are accommodated in the soundproof enclosure to enhance a soundproofing effect and to make the system compact.

Further, a passageway for a person to walk along may be installed at the level of the vertical gas turbine and the vertical reduction gears and a stairway is connected between the passageway and a floor to facilitate access to and service of the system.

Although the gas turbine system of this invention can be used to drive various kinds of industrial machine, such as a pump, a compressor and a generator, the vertical gas turbine system of the present invention is preferably installed above an industrial machine having a vertical drive shaft, like a vertical pump.

According to a gas turbine system of the present invention, since a vertical turbine and vertical reduction gears are stacked up and connected to constitute a vertical gas turbine system as described above, the planar installation area can be reduced considerably in comparison to the conventional gas turbine system.

In particular, when the vertical gas turbine system is installed above a vertical pump, it is possible to considerably reduce the planar space for a pumping plant, or the like, where the vertical gas turbine system is installed.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

One embodiment of the present invention will be described below in detail with reference to FIG. 1.

Figure 1:
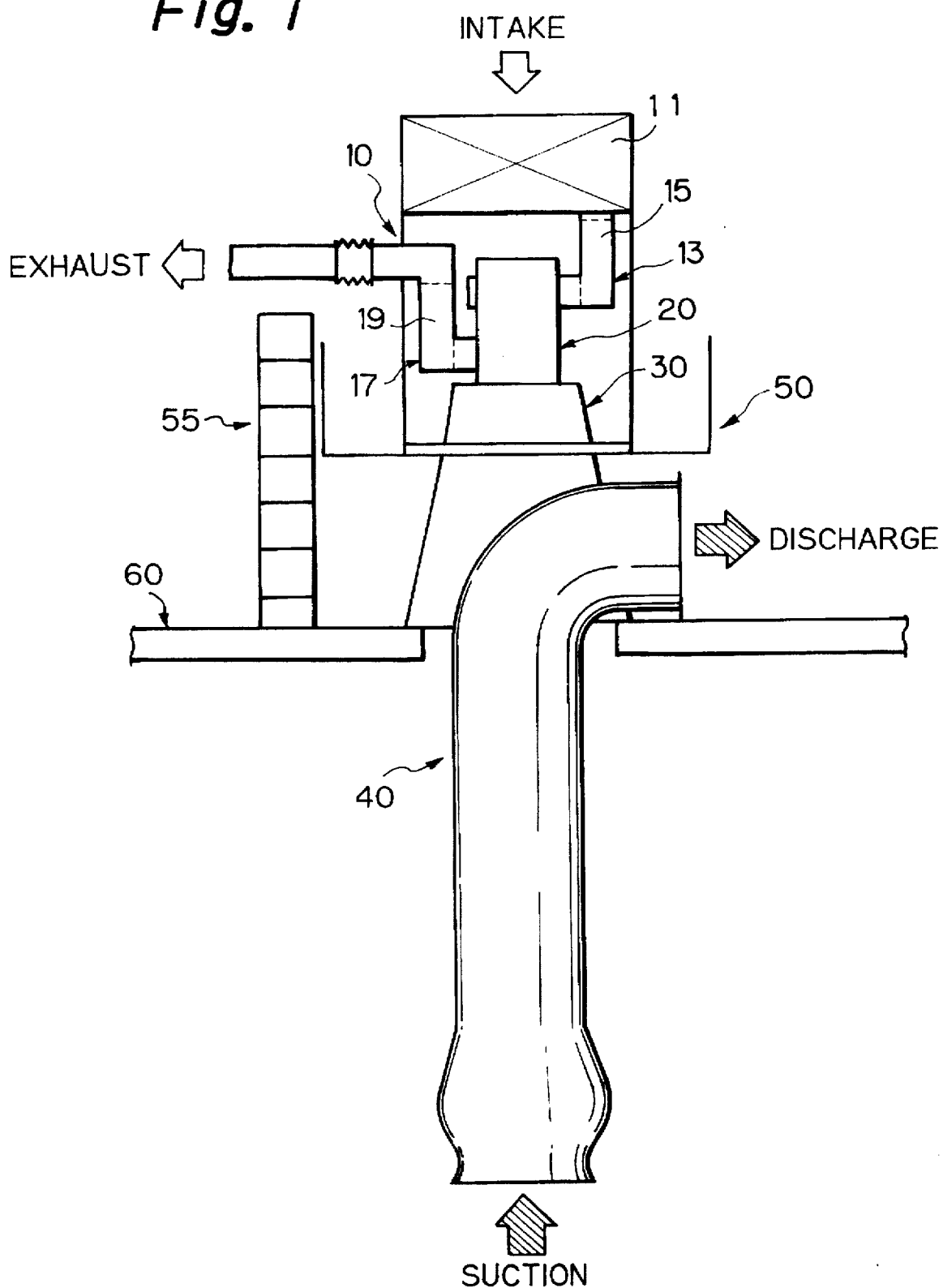
FIG. 1 is a side view schematically showing a vertical gas turbine system according to one embodiment of the present invention.

FIG. 1 is a side view schematically showing a vertical gas turbine system according to one embodiment of the present invention. As shown in the figure, the vertical gas turbine system has a vertical speed reducer or reduction gears 30 and a vertical gas turbine 20 stacked up above a vertical pump 40. The vertical gas turbine 20 and the vertical reduction gears 30 are accommodated in a soundproof enclosure 10.

It should be noted that the term "vertical" as employed herein for the vertical gas turbine 20 and other constituent elements means a structure in which, when the relevant device is installed in position, its shaft extends vertically. Accordingly, the respective shafts of the vertical gas turbine 20, the vertical reduction gears 30 and the vertical pump 40 are connected in series in the vertical direction.

Meanwhile, an intake device 11 is attached to the upper side of the soundproof enclosure 10. In addition, an inlet air silencer 15 and an exhaust air silencer 19, which are attached to an inlet pipe 13 and exhaust pipe 17 of the vertical gas turbine 20, are also accommodated in the soundproof enclosure 10.

Further, a passageway 50, which is sufficiently wide for at least one person to walk on, is installed at the level where the vertical gas turbine 20 and the vertical reduction gears 30 are installed. A stairway 55 is connected to the passageway 50 so that it is possible to access the passageway 50 from the floor 60 to facilitate the access and services to the vertical gas turbine 20, the vertical reduction gears 30, and so on.

As the vertical gas turbine 20 is driven, the main shaft of the vertical pump 40 is driven through the vertical reduction gears 30, thereby allowing water to be pumped up.

As has been described above, according to the embodiment shown, a vertical gas turbine and vertical reduction gears are used, and these elements are installed above the vertical pump 40. Accordingly, the planar installation area can be considerably reduced in comparison to the conventional gas turbine system.

In addition, by installing the passageway 50, as stated above, the building for accommodating the gas turbine system, which has heretofore required a double-floor structure, can be changed to a single-floor building. This enables to considerably reduce a construction space and a construction cost.

It should be noted that since the vertical gas turbine 20, the vertical reduction gears 30, the inlet air silencer 15, the exhaust air silencer 19 are accommodated in the soundproof enclosure 10, noise generated from these devices can be satisfactorily deadened.

Figure 2:
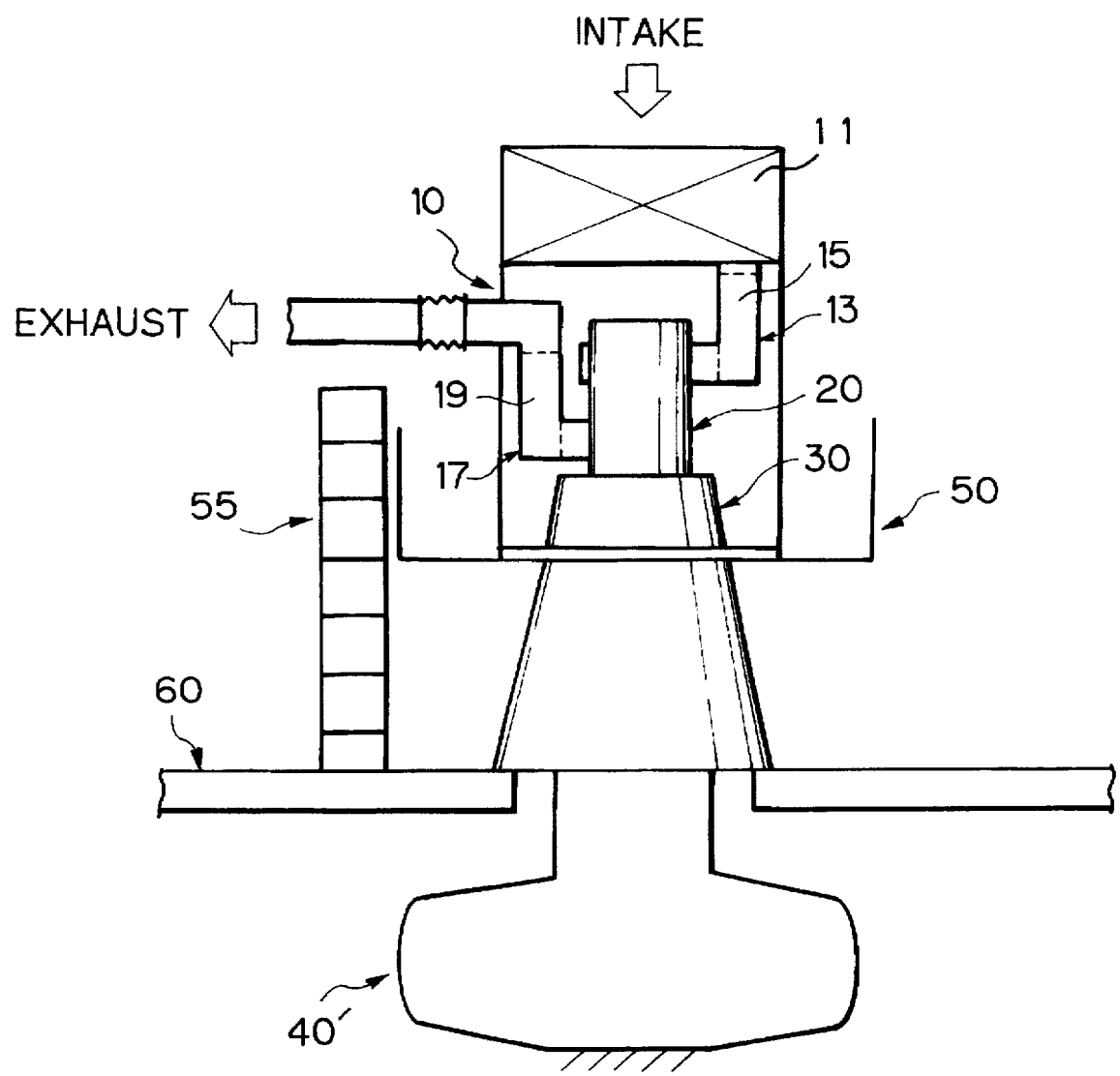
FIG. 2 is a view similar to that shown in FIG. 1, but showing another embodiment of the present invention.
Figure 3:
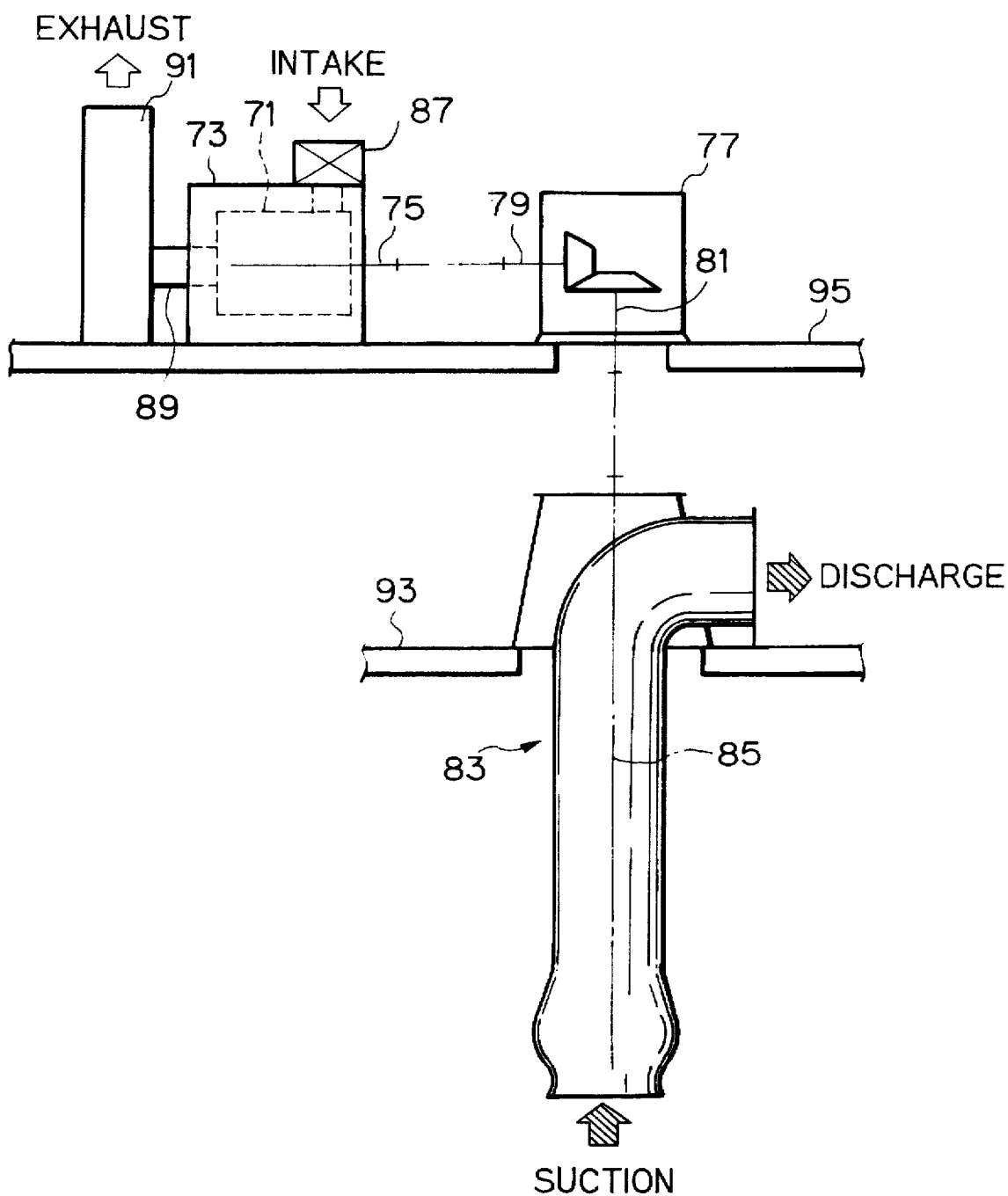
FIG. 3 is a side view schematically showing a conventional gas turbine system.

Although in the foregoing embodiment the vertical gas turbine system of the present invention is installed above a vertical pump, it is a matter of course that the present invention can also be used to drive apparatuses other than the vertical pump. For example, as shown in FIG. 2, the vertical gas turbine system of the present invention can be used to drive an industrial machine having a vertical drive shaft such as a compressor or generator 40', and even can be used to drive an apparatus which has no vertical drive shaft.

As has been detailed above, the vertical gas turbine system of the present invention provides the following advantageous effects:

① Since the installation area can be reduced to a considerable extent in comparison to the conventional gas turbine system, it is possible to reduce considerably the planar space for a pumping plant, or the like, where the vertical gas turbine system is installed.

② The building for accommodating the gas turbine system, which has heretofore required a double-floor structure, can be readily changed to a single-floor building and the access, to and services in the gas turbine system, can be facilitated by installing a passageway at the level where the vertical gas turbine system and the vertical reduction gears are installed.

What is claimed is:

1. A gas turbine system for a pump, comprising:

a soundproof enclosure;

a gas turbine;

reduction gears connected to said gas turbine;

an inlet silencer and an exhaust silencer attached to an inlet pipe and an exhaust pipe, respectively, of said gas turbine;

said gas turbine, said reduction gears, and said pump being a vertical gas turbine, vertical reduction gears, and a vertical pump, respectively, which are stacked up and which have shafts thereof which are connected vertically;

said vertical gas turbine and said vertical reduction gears being accommodated in said soundproof enclosure, said vertical pump being disposed outside of said soundproof enclosure; and said vertical gas turbine, said vertical reduction gears and said vertical pump being installed on a single floor.

2. A gas turbine system according to claim 1, wherein said inlet silencer and said exhaust silencer are accommodated in said soundproof enclosure in addition to said vertical gas turbine and said vertical reduction gears.

3. A gas turbine system according to claim 1 or 2, further comprising a passageway for a person to walk on installed at level below said vertical gas turbine and below an upper end of said vertical reduction gears, and a stairway connected between said passageway and said floor situated below said passageway.

4. A gas turbine system according to claim 1 or 2, further comprising a passageway for a person to walk on installed at a level at said vertical reduction gears, and a stairway is connected between said passageway and said floor situated below said passageway.

5. A gas turbine system according to claim 1 or 2, wherein said vertical gas turbine is directly stacked on said vertical reduction gears, said vertical pump being installed at said single floor, and said vertical gas turbine and said vertical reduction gears being supported on said single floor through support means.

6. A gas turbine system according to claim 1 or 2, wherein said inlet pipe is connected to an upper portion of said vertical gas turbine and extends therefrom to an upper portion of said soundproof enclosure, and said exhaust pipe is connected to a lower portion of said vertical gas turbine and extends therefrom to a side portion of said soundproof enclosure.

* * * * *